United States Patent
Watanabe et al.

(10) Patent No.: US 6,763,659 B2
(45) Date of Patent: Jul. 20, 2004

(54) EXHAUST EMISSION CONTROL DEVICE FOR INTERNAL COMBUSTION ENGINE

(75) Inventors: Tetsuya Watanabe, Aichi (JP); Setsuo Nishihara, Aichi (JP); Tamon Tanaka, Nara (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/376,220

(22) Filed: Mar. 4, 2003

(65) Prior Publication Data

US 2003/0217549 A1 Nov. 27, 2003

(30) Foreign Application Priority Data

Mar. 4, 2002 (JP) ..................................... P2002-057720

(51) Int. Cl.$^7$ ................................................. F01N 3/00
(52) U.S. Cl. ............................. 60/297; 60/285; 60/286; 60/311
(58) Field of Search .......................... 60/280, 285, 286, 60/295, 297

(56) References Cited

U.S. PATENT DOCUMENTS

| 6,422,001 | B1 | * | 7/2002 | Sherman et al. | ............... 60/274 |
| 6,438,948 | B2 | * | 8/2002 | Ono et al. | .................... 60/311 |
| 6,574,956 | B1 | * | 6/2003 | Moraal et al. | ................ 60/295 |
| 6,598,387 | B2 | * | 7/2003 | Carberry et al. | ............. 60/297 |
| 6,622,480 | B2 | * | 9/2003 | Tashiro et al. | ................ 60/295 |

* cited by examiner

*Primary Examiner*—Binh Q. Tran
(74) *Attorney, Agent, or Firm*—Birch, Stewart, Kolasch & Birch, LLP

(57) ABSTRACT

An exhaust emission control device having a deposit amount detecting section for detecting a deposit amount correlation value Qpm of the particulate matter captured by a diesel particulate filter, a temperature detecting section for detecting a temperature correlation value Tdpf of the particulate filter, and a correction section for correcting the target idle rotating speed Ni to the higher rotating speed to suppress overheating of the diesel particulate filter in accordance with detection results of the deposit amount detecting section and the temperature detecting section.

7 Claims, 4 Drawing Sheets

EXHAUST EMISSION CONTROL DEVICE FOR INTERNAL COMBUSTION ENGINE

This nonprovisional application claims priority under 35 U.S.C. §119(a) on patent application No. 2002-057720 filed in JAPAN on Mar. 4, 2002, which is herein incorporated by reference.

BACKGROUND OF THE INVENTION

1. Field of the Invention

The present invention relates to an exhaust emission control device for an internal combustion engine, particularly to a technology for preventing super heating melt down of a particulate filter disposed in an exhaust passage of a diesel engine.

2. Description of the Related Art

An exhaust gas from a diesel engine mounted on a vehicle such as a bus and a truck contains a large quantity of particulate matter (abbreviated as PM), in addition to HC, CO and $NO_x$.

Thus, a technology in which a diesel particulate filter (abbreviated as DPF) for capturing the PM is disposed as a post processor of the diesel engine in an engine exhaust system, and the captured PM is heated by an external heat source, and burned and removed has been developed and put into practical use.

Recently, a continuous regeneration DFP has been developed which can continuously treat the PM on the DFP by providing an oxidation catalyst that supplies an oxidant for oxidizing and removing the PM on the upstream side of the DPF.

By the way, in the DPF, even when no external heat source is used for heating, the PM is naturally combusted, burned and removed, if the temperature of the DPF rises above a certain value. For example, when the vehicle runs up an ascending slope with the diesel engine in high load driving, the temperature of the DPF reaches the certain value, or is elevated near the certain value (slightly lower than the certain value), so that the PM is naturally combusted under high oxygen concentration or combusted with high possibility.

From this reason, when the diesel engine is suddenly switched from high load driving to idle driving, for example, when the vehicle stops immediately after running up an ascending slope, a combustion gas is rapidly decreased to reduce the flow rate of exhaust gas, and the heat taking away amount is reduced, resulting in a problem that when the PM is combusting, the DPF sharply rises in temperature due to a heat of combustion to more likely melt down due to superheating. Also, under the same conditions, the heat taking away amount is reduced and the oxygen concentration is increased even when the PM is in a state immediately before combustion, resulting in a problem that when the PM comes to combustion, the DPF also sharply rises in temperature due to a heat of combustion to more likely melt down due to superheating.

Thus, it is conceived that when the diesel engine is switched from high load driving to idle driving, the engine speed is increased irrespective of the deposit amount of PM and the temperature of the DPF, to prevent the flow rate of exhaust gas from being reduced and keep the heat taking away amount.

However, it is inefficient to increase the engine speed even in a situation where it is hardly apprehended that the DPF is superheated, for example, when the deposit amount of PM is relatively small, or when the temperature of the DPF is not too high, because there is a risk that the fuel consumption is aggravated, or the DPF is supercooled.

SUMMARY OF THE INVENTION

An object of the invention is to provide an exhaust emission control device for an internal combustion engine that can efficiently and securely prevent a particulate filter disposed in an exhaust passage of the diesel engine from melting down due to superheating.

In order to achieve the above object, a first aspect of the invention provides an exhaust emission control device for an internal combustion engine, comprising: a particulate filter for capturing the particulate matter in an exhaust gas, the particulate filter disposed in an exhaust system for the internal combustion engine; deposit amount detecting means for detecting a deposit amount correlation value of the particulate matter captured by the particulate filter; temperature detecting means for detecting a temperature correlation value of the particulate filter; idle rotating speed control means for controlling the rotating speed of the internal combustion engine to be a target idle rotating speed when the internal combustion engine is in an idle driving state; and correction means for correcting the target idle rotating speed to the higher rotating speed to prevent the particulate filter from being overheated in accordance with detection results of the deposit amount detecting means and the temperature detecting means.

That is, when the internal combustion engine is in the idle driving state, the target idle rotating speed is controlled by the idle rotating speed control means. If there is a risk that the particulate filter is overheated, the target idle rotating speed is corrected to the higher rotating speed by the correction means in accordance with the detection results of the deposit amount detecting means and the temperature detecting means.

Accordingly, when the vehicle stops immediately after running up an ascending slope, in other words, when the internal combustion engine is changed to the idle driving immediately after the high load driving, the flow rate of exhaust gas is reduced and the heat taking away amount is decreased, with the result that when the particulate matter (PM) captured by the particulate filter (DPF) is combusted due to the high load driving, the DPF sharply rises in temperature. But the target idle rotating speed is corrected to the higher rotating speed in accordance with the deposit amount correlation value of PM and the temperature correlation value of the DPF to prevent the flow rate of exhaust gas from being reduced and keep the heat taking away amount, whereby the DPF is efficiently and securely prevented from melting down to superheating. Also, under the same conditions, the heat taking away amount is decreased and the oxygen concentration is increased even when the PM is in a state immediately before combustion, with the result that when the PM comes to combustion, the DPF also sharply rises in temperature due to a heat of combustion. But if the target idle rotating speed is corrected to the higher rotating speed in accordance with the deposit amount correlation value of PM and the temperature correction value of the DPF, it is possible to appropriately prevent the flow rate of exhaust gas from being reduced, keep the heat taking away amount, and efficiently and securely prevent the DPF from melting down due to superheating.

A second aspect of the invention is characterized in that the correction means corrects the target idle rotating speed to the higher rotating speed, when the deposit amount correlation value of the particulate matter detected by the deposit amount detecting means is larger.

Accordingly, when the deposit amount correlation value of PM is larger, the quantity of combustion heat produced by combustion of PM is increased, so that the DPF is more likely superheated. However, the target idle rotating speed is corrected to the higher rotating speed, as the deposit amount correlation value of PM is larger, whereby it is possible to keep the heat taking away amount to have an appropriate flow rate of exhaust gas to prevent overheating the DPF. On the other hand, when the deposit amount correlation value of PM is not so large, the correction amount of the target idle rotating speed is suppressed to the required minimum value to prevent the fuel consumption from being aggravated and the supercooling of the DPF, whereby the DPF is efficiently and securely prevented from melting down due to superheating.

Also, a third aspect of the invention is characterized in that the correction means corrects the target idle rotating speed to the higher rotating speed when the temperature correlation value of the particulate filter detected by the temperature detecting means is above a predetermined value, or inhibits or suppresses the correction for the target idle rotating speed when the temperature correlation value is at or below the predetermined value.

Accordingly, the DPF is likely to be superheated as the temperature correlation value of the DPF is large. When the temperature correlation value of the DPF is above the predetermined value, the target idle rotating speed is corrected to a high rotating speed, whereby it is possible to keep the heat taking away amount to have an appropriate flow rate of exhaust gas to avoid overheating of the DPF. On the other hand, when the temperature correlation value of the DPF is at or below the predetermined value, the target idle rotating speed is not corrected to the higher rotating speed to prevent the fuel consumption from being aggravated and the supercooling of the DPF, whereby the DPF is efficiently and securely prevented from melting down due to superheating.

Also, a fourth aspect of the invention is characterized in that the predetermined value is set to a lower temperature, when the deposit amount correlation value of the particulate matter detected by the deposit amount detecting means is larger. Accordingly, the DPF is likely to be superheated as the deposit amount correlation value of PM and the temperature correlation value of the DPF are large, but the predetermined value as a threshold for discriminating the temperature correlation value of the DPF is decreased to a lower temperature. Thereby, the target idle rotating speed is corrected to a high rotating speed, when the temperature correlation value of the DPF is above the predetermined value in accordance with the deposit amount correlation value of PM, to keep the heat taking away amount to have an appropriate flow rate of exhaust gas. On the other hand, when the temperature correlation value of the DPF is lower than or equal to the predetermined value in accordance with the deposit amount correlation value of PM, the target idle rotating speed is not corrected to the higher rotating speed to prevent the fuel consumption from being aggravated and the supercooling of the DPF, whereby the DPF is efficiently and securely prevented from melting down due to superheating.

DETAILED DESCRIPTION OF THE PREFERRED EMBODIMENTS

The preferred embodiments of an exhaust emission control device for an internal combustion engine according to the present invention will be described below with reference to the accompanying drawings.

Figure 1:
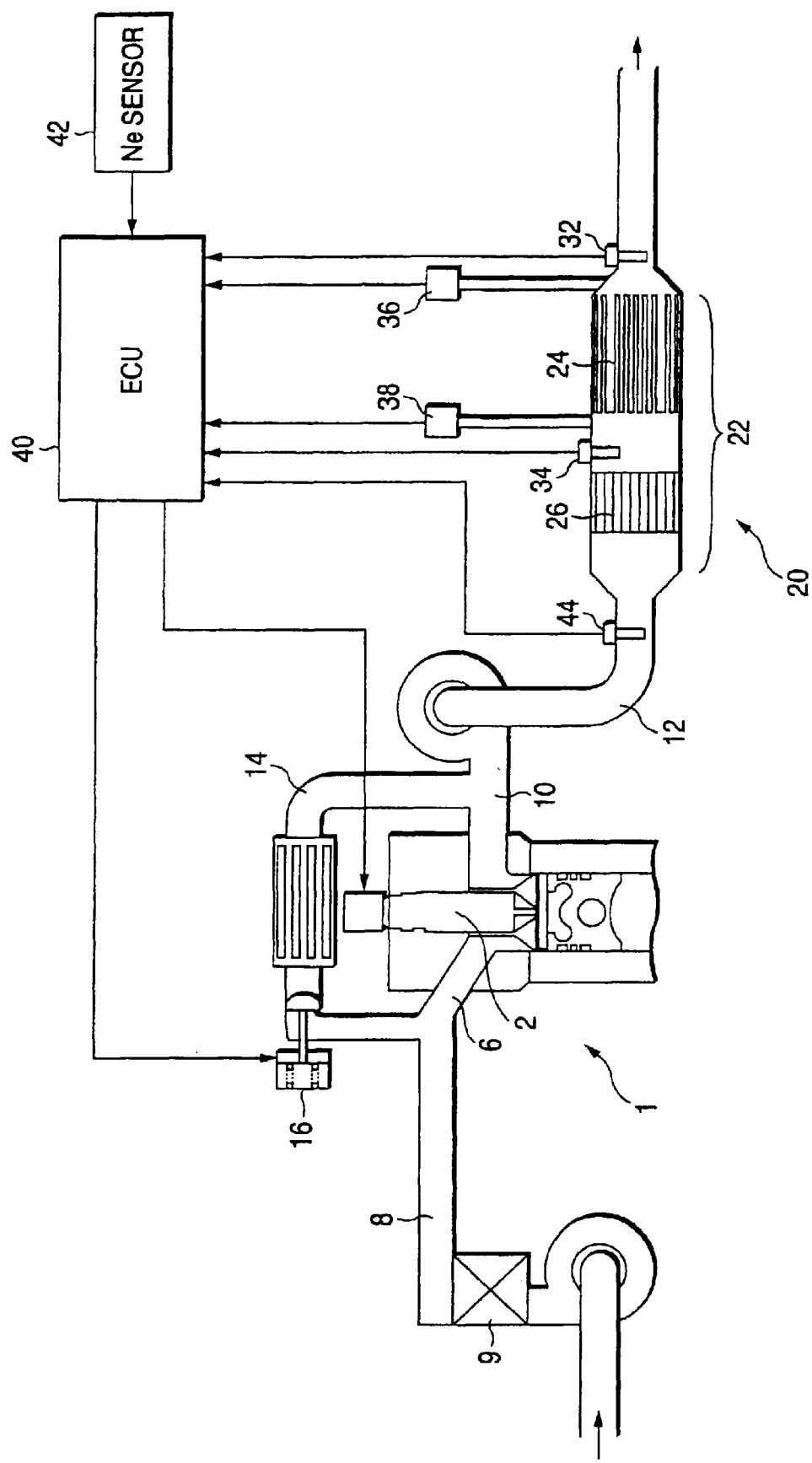
FIG. 1 is a schematic constitution diagram of an exhaust emission control device for an internal combustion engine according to one embodiment of the present invention.

FIG. 1 is a schematic view of the exhaust emission control device for an internal combustion engine according to one embodiment of this invention.

As the engine 1, an inline 4-cylinder diesel engine (hereinafter simply referred to as an engine) is employed.

A fuel supply system of the engine 1 is composed of a common rail system. This system is provided with an injector (fuel injection nozzle) 2 for each cylinder, the injector 2 being connected to a common rail (not shown). Each injector 2 is connected to an electronic control unit (ECU) 40, and an injector valve is open or closed in accordance with a fuel injection instruction from the ECU 40, whereby a high pressure fuel within the common rail can be injected into each combustion chamber at a desired timing. That is, the injector 2 can make a main injection for main combustion, an additional injection (post injection) for the fuel and a rest of the fuel injection. Since the common rail system is well known, the details of the constitution of the common rail system are omitted.

A suction pipe 8 is connected to a suction port of the engine 1 via a suction manifold 6, and is provided with an air cleaner 9.

On the other hand, an exhaust pipe 12 is connected to an exhaust port via an exhaust manifold 10.

An EGR passage 14 extends from the exhaust manifold 10, a terminal end of the EGR passage 14 being connected to the suction manifold 6. And an electromagnetic EGR valve 16 is interposed on the EGR passage 14.

A postprocessing unit 20 is interposed in the exhaust pipe 12. The postprocessing unit 20 is an exhaust emission control device including a catalytic converter and a diesel particulate filter (DPF) for purifying harmful components (HC, CO, $NO_x$) and the PM (particulate matter) contained in the exhaust gas. Herein, the postprocessing unit 20 is a so-called continuous regeneration type diesel particulate filter (continuous regeneration type DFP) 22 having an oxidation catalyst 26 upstream of the DPF 24.

The continuous regeneration type DPF 22 purifies the PM deposited on the DPF 24 through a continuous oxidation reaction by producing an oxidant ($NO_2$) with an oxidation catalyst 26 and supplying the oxidant ($NO_2$) to the DPF 24.

Also, an exhaust gas temperature sensor 32 and an exhaust gas temperature sensor 34 for sensing the exhaust gas temperature as the temperature correlation value for the temperature Tdpf of the DPF 24 and the temperature Tcat of the oxidation catalyst 26 are provided on the upstream and downstream portions of the exhaust pipe 12 from the DPF 24, respectively (temperature detecting means 56).

Moreover, an exhaust pressure sensor 36 and an exhaust pressure sensor 38 for sensing the exhaust pressure upstream and downstream from the DFP 24 as the PM deposit amount correlation value are provided on the upstream and downstream portions of the exhaust pipe 12 from the DPF 24, respectively (deposit amount detecting means 58).

The ECU 40 is a control unit for controlling the overall exhaust emission control device for an internal combustion engine according to the invention, including the engine 1.

On the input side of the ECU 40, various sorts of sensors are connected, including the exhaust gas temperature sensors 32, 34, the exhaust pressure sensors 36, 38, an Ne sensor for sensing the engine speed Ne, and an air-fuel ratio sensor 44.

A sensor 46 for sensing the depressing amount of an accelerator pedal, not shown, is provided, whereby the fuel supply amount to the engine 1 is set from the depressing amount and the engine speed Ne (fuel injection amount setting means 64) and the fuel amount supplied to the engine is controlled (fuel injection control means 62).

This sensor 46 also functions as a sensor for sensing whether or not the engine 1 is in the idle driving state (idle sensing means 50). In the idle driving, the engine speed Ne is controlled to be the target idle rotating speed Ni by the ECU 40 (idle rotating speed control means 54). The target idle rotating speed Ni is not limited to a fixed value, but the target idle rotating speed Ni in the idle driving state of the engine 1 may be set in accordance with the driving state of the engine (idle rotating speed setting means 52).

On the other hand, on the output side of the ECU 40, various sorts of devices are connected, including the injector and an EGR valve 16. On the basis of various kinds of input information, the air-fuel ratio, the fuel injection amount, the fuel injection timing, and the suction air amount are set and output as the instructed values.

Figure 4:
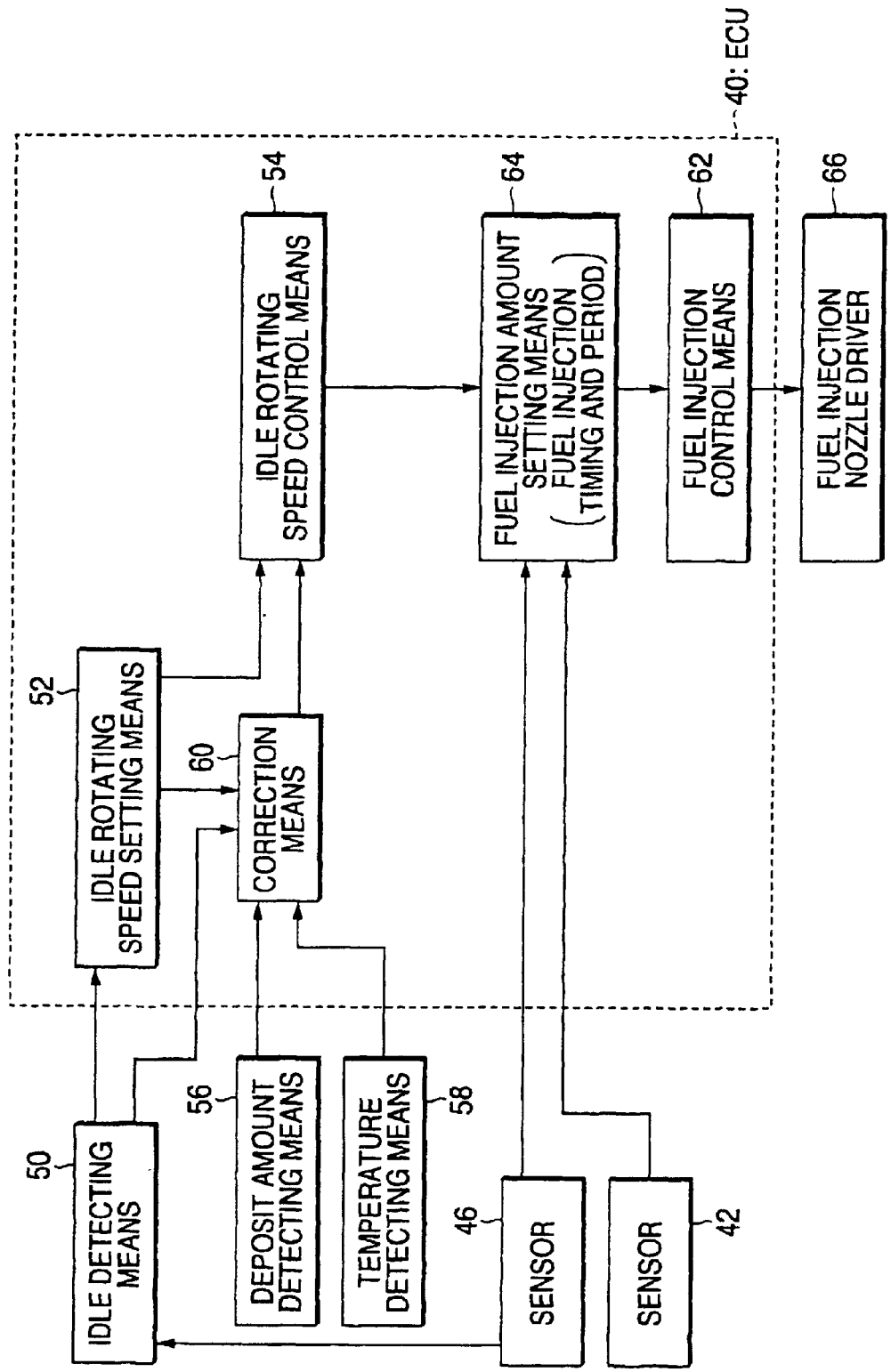
FIG. 4 is a control block diagram of the DPF meltdown prevention control according to the embodiment.

Referring to FIG. 4, the fuel injection control in the normal driving (other than the meltdown prevention control of the DPF 24 as described below in detail) will be described below.

In the normal driving other than the idle driving, the fuel injection amount timing and the injection period are set in the fuel injection amount setting means 64 on the basis of the engine speed Ne sensed by the sensor 42 and the depressing amount of accelerator pedal sensed by the sensor 46. And the fuel injection control means 62 controls a fuel injection nozzle driver 66 on the basis of the fuel injection timing and the injection period set by the fuel injection amount setting means 64. On the other hand, in the idle driving (where the depressing amount of accelerator pedal is detected by the idle detecting means 50), the fuel injection timing and the injection period are set by the fuel injection amount setting means 64 on the basis of an output from the idle rotating speed control means 54 so that the rotating speed may be the target idle rotating speed Ni set by the idle rotating speed setting means 52. And the fuel injection control means 62 controls the fuel injection nozzle driver 66 on the basis of the fuel injection timing and the injection period during the idle driving which are set by the fuel injection amount setting means 64.

The operation of the exhaust emission control device for an internal combustion engine according to this invention will be described below.

The PM in the exhaust gas exhausted from the internal combustion engine is captured by the DPF 24. In the continuous regeneration type DPF 22, when the catalyst temperature Tcat and the DFP temperature Tdpf are higher than or equal to a predetermined temperature T0 (e.g., 350° C.), and the oxidation catalyst 26 is in an activated state, the following phenomenon occurs. That is, with the oxidation catalyst 26, CO and HC are oxidized and removed owing to the oxidation reaction, and $NO_2$ that is an oxide of nitrogen component N in the exhaust gas is produced as the oxidant. And $NO_2$ produced by the oxidation catalyst 26 is supplied to the DPF 24, and the PM captured by the DPF 24 is oxidized by $NO_2$. That is, in the continuous regeneration type DPF 22, the PM captured by the DPF 24 is continuously oxidized and removed by $NO_2$ as the oxidant produced by the oxidation catalyst 26.

In a situation where the PM captured by the DPF 24 is not continuously oxidized, the DPF 24 is heated by an external heat source, so that the PM is forcefully removed. That is, the DPG 24 is forcefully regenerated. In this case, the external heat source may be a heater. Herein, the exhaust gas temperature is elevated by mainly injecting a fuel for main combustion and then additionally injecting a fuel (post injection) in an expansion stroke to heat the DPF 24.

In the continuous regeneration type DPF 22, when the exhaust gas temperature is high, and the DPF 24 has very high temperature, in which the DPF temperature Tdpf is higher than a predetermined temperature T1 (e.g., 550° C.), such as when the vehicle runs up an ascending slope with the engine 1 in the high load driving, the PM captured by the DPF 24 is heated irrespective of $NO_2$, and naturally burned or burned with high possibility.

However, in a situation where the PM is naturally burned by heating, or the PM is burned with high possibility, when the engine 1 switches from high load driving to idle driving, such as when the vehicle runs up an ascending slope and then stops immediately after the end of the ascending slope, the flow rate of exhaust gas is suddenly reduced due to a decrease in the combustion gas, and the heat taking away amount is reduced, bringing about a danger that the DPF 24 is superheated to melt down.

Referring to FIG. 4, a control block of the DPF melt-down prevention control according to the invention will be described below. When the PM deposit amount correlation value Qpm detected by deposit amount detecting means 56 is more than or equal to a predetermined value, and the DPF temperature Tdpf detected by temperature detecting means 56 exceeds a predetermined value (temperature) set in accordance with the PM deposit amount correlation value, correction means 60 sets the target idle rotating speed Ni set by the idle rotating speed setting means 52 to the higher rotating speed. Then, the idle rotating speed control means 54 outputs the information to the fuel injection amount setting means 64 to obtain the corrected target idle rotating speed.

In this invention, the DPF 24 is efficiently prevented from melting down due to superheating. The melt-down prevention control for the DPF 24 according to the invention will be described below.

Figure 2:
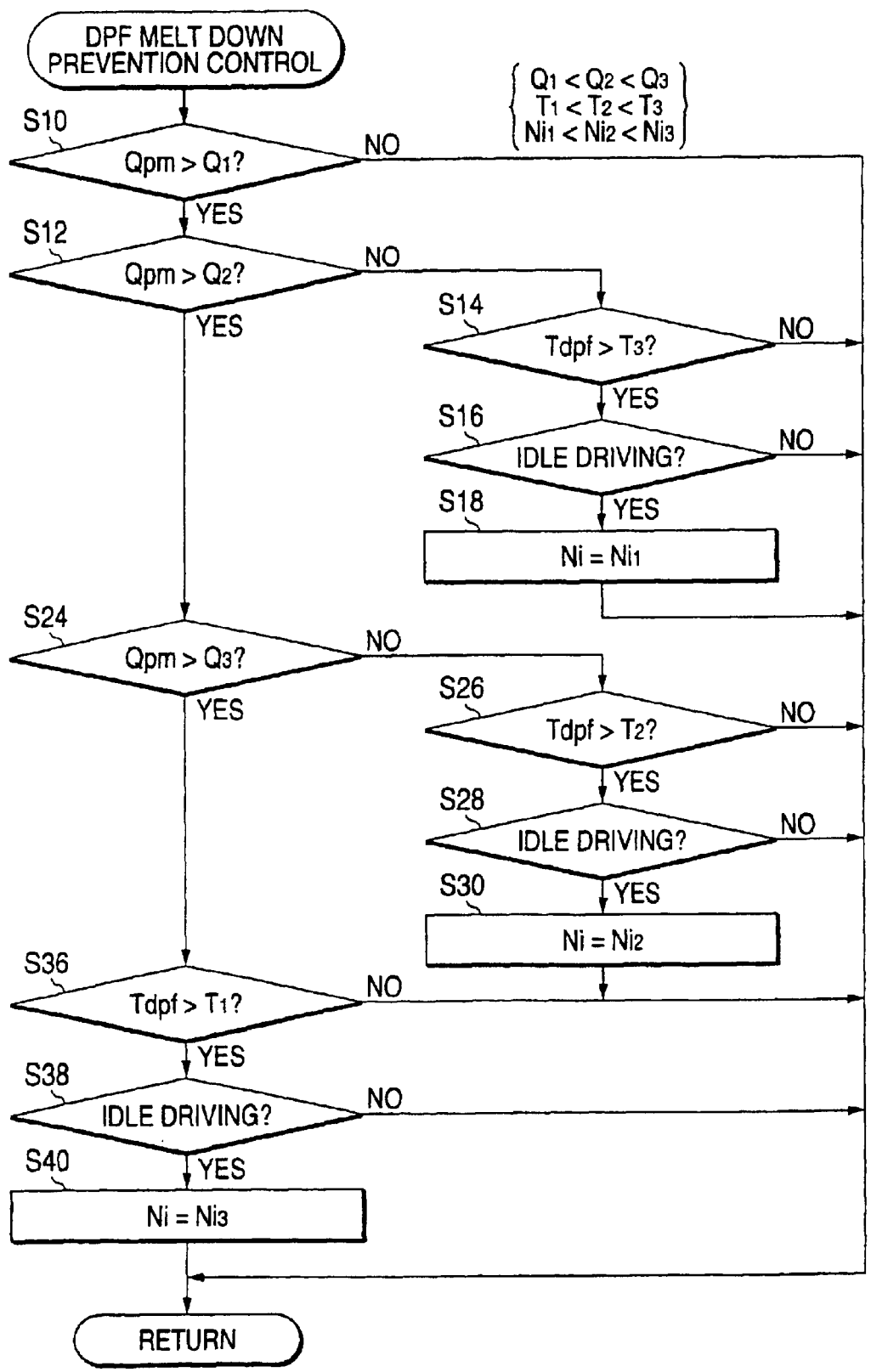
FIG. 2 is a flowchart showing a control routine for a DPF meltdown prevention control according to the embodiment.

FIG. 2 is a flowchart for a control routine of the DPF melt-down prevention control according to the invention. This control routine will be described below with reference to the flowchart.

At step S10, a determination is made whether or not the deposit amount of PM captured by the DPF 24, or the PM deposit amount correlation value Qpm, is greater than a predetermined value Q1 (e.g., 7 g/L) (Qpm>Q1).

Herein, the PM deposit amount correlation value Qpm is easily obtained from a differential pressure between the exhaust pressures detected by the exhaust pressure sensors 36 and 38. That is, if the PM is deposited on the DPF 24, the exhaust gas resistance is greater to increase the exhaust pressure on the upstream side of the DPF 24 and decrease the exhaust pressure on the downstream side of the DPF 24, whereby the differential pressure between the exhaust pressures detected by the exhaust pressure sensors 36 and 38 and the PM deposit amount correlation value Qpm are almost proportional, during the engine 1 is in the same driving state.

The differential pressure between the exhaust pressures detected by the exhaust pressure sensors 36 and 38 is obtained, and the driving state of the engine 1 is considered, whereby the PM deposit amount correlation value Qpm is easily detected (deposit amount detecting means 56).

In the constitution of the deposit amount detecting means 56 for detecting the PM deposit amount correlation value, the PM deposit amount correlation value Qpm may be estimated on the basis of the temperature frequency of the DPF having influence on the continuous regeneration of the PM captured by the DPF. That is, on the basis of the frequency that the temperature of the DPF detected by the temperature detecting means is lower than the temperature at which the PM captured by the DPF can be burned, it is determined that the PM deposit amount captured by the DPF is large when the frequency determined by the temperature frequency means is high.

Moreover, in the PM burning, a great amount of $NO_2$ to react carbon (C) in the PM is produced in a state where there is a great amount of $NO_x$ in the exhaust gas, whereby the combustion action of the PM tends to be activated. Therefore, the ratio of $NO_x$/Soot contained in the exhaust gas of the engine is determined, and the $NO_x$/Soot ratio is lower, the temperature frequency determined from the temperature of the DPF is corrected to increase, whereby the deposit amount of PM captured by the DPF can be estimated more correctly.

If the determination result at step S10 is true (Yes), and it is determined that the PM deposit amount correlation value Qpm is greater than the predetermined amount Q1, the routine goes to step S12.

At step S12, a determination is made whether or not the PM deposit amount correlation value Qpm is greater than the predetermined amount Q2 (e.g., 10 g/L) (Qpm>Q2). If the determination result is false (No), and it is determined that the PM deposit amount correlation value Qpm is smaller than or equal to the predetermined amount Q2, namely, the PM deposit amount correlation value Qpm is greater than the predetermined amount Q1, and smaller than or equal to the predetermined amount Q2, the routine goes to step S14.

At step S14, a determination is made whether or not the temperature of the DPF 24, or the DPF temperature Tdpf, is greater than a predetermined temperature T3 (predetermined value, e.g., 650° C.). Herein, the exhaust gas temperature is detected as the temperature correlation value of the DPF temperature Tdpf by the exhaust gas temperature 32, and the DPF temperature Tdpf is obtained from the exhaust gas temperature (temperature detecting means 58) to determine whether or not the DPF temperature Tdpf is greater than the predetermined temperature T3.

If the determination result at step S14 is true (Yes), and it is determined that the DPF temperature Tdpf is greater than the predetermined temperature T3, the routine goes to step S16.

At step S16, a determination is made whether or not the engine 1 is during the idle driving. If the determination result is true (Yes), and it is determined that the engine 1 is during the idle driving, the routine goes to step S18, where the target idle rotating speed Ni in the steady idle driving state of the engine 1 that is set by the idle rotating speed setting means is set to the predetermined value Ni1 (e.g., 900 rpm) that is greater than the normal value Ni0 (e.g., 750 rpm) and the required minimum value (correction means 60). In this case, the target idle rotating speed Ni maybe gradually increased.

That is, if the PM deposit amount correlation value Qpm is greater than the predetermined amount Q1, and smaller than or equal to the predetermined amount Q2, and the DPF temperature Tdpf is higher than the predetermined temperature T3, there is a high possibility that the PM is naturally burned to cause the DPF 24 to be superheated and melt down. Accordingly, in this case, the target idle rotating speed Ni is set to the predetermined value Ni1 that is greater than the normal value Ni0 to increase the exhaust gas flow rate and the heat taking away amount and suppress a rise in the temperature of the DFP 24. Thereby, the DPF 24 is securely prevented from melting down due to superheating. Also, since an increased amount of the target idle rotating speed Ni is suppressed to the required minimum value, the DPF 24 is efficiently prevented from melting down due to superheating, without aggravating the fuel consumption or supercooling the DPF 24 due to an exhaust gas stream.

At step S16, if the determination result is false (No), and it is determined that the engine 1 is not during the idle driving, the routine directly returns.

On the other hand, if the determination result at step S10 is false (No), the PM deposit amount correlation value Qpm is less than or equal to the predetermined amount Q1, or the determination result at step S14 is false (No), and it is determined that the DPF temperature Tdpf is less than or equal to the predetermined temperature T3, not withstanding the PM deposit amount correlation value Qpm is greater than the predetermined amount Q1, and smaller than or equal to the predetermined amount Q2, there is no possibility that the PM is naturally burned to cause the DPF 24 to be superheated and melt down, irrespective of whether or not the engine is during the idle driving. Accordingly, the routine directly returns without increasing the target idle rotating speed Ni (correction inhibition).

Thereby, the DPF 24 is prevented more efficiently from melting down due to superheating without uselessly increasing the target idle rotating speed Ni to aggravate the fuel consumption and supercooling the DPF 24 with an exhaust gas stream.

Figure 3:
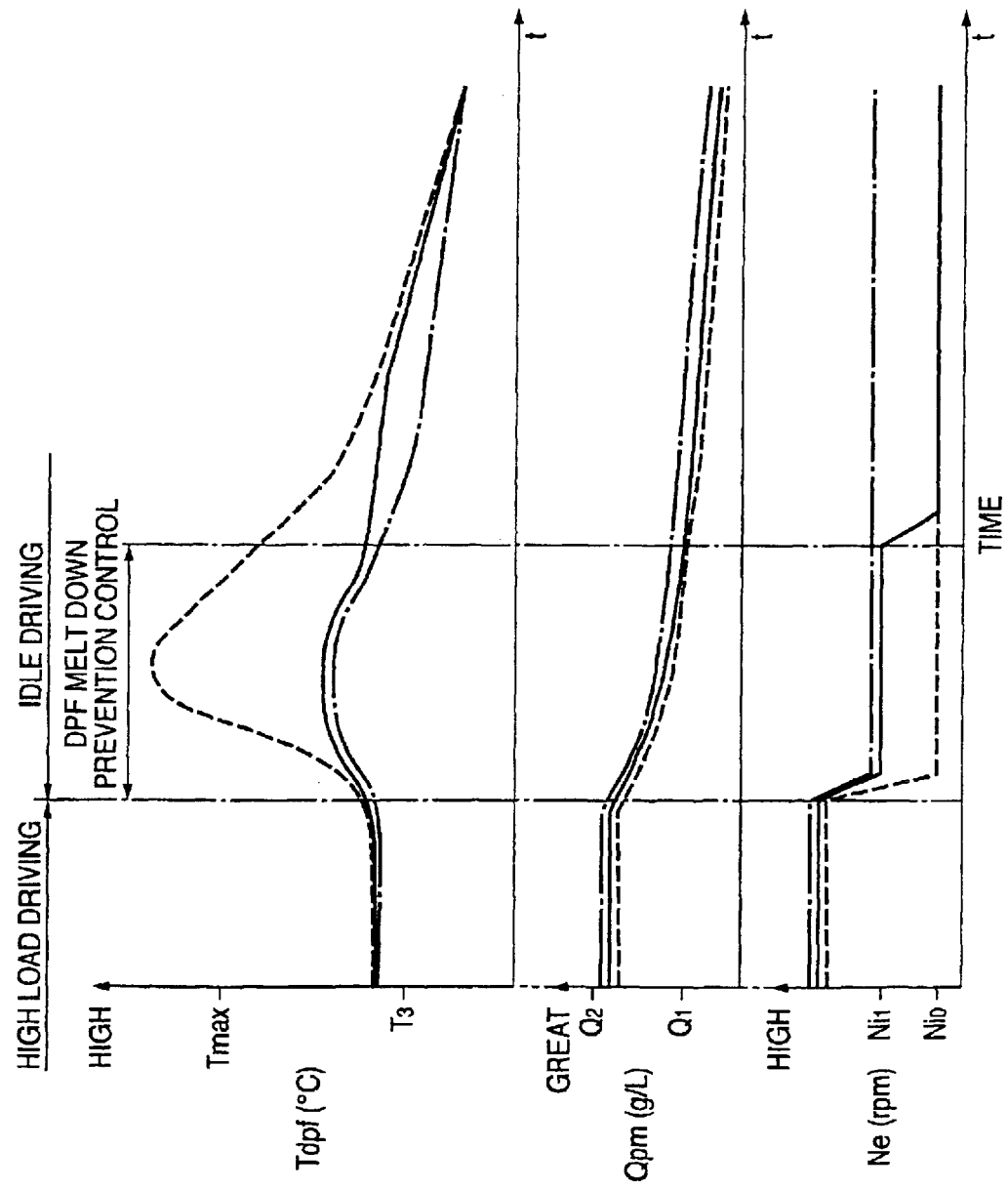
FIG. 3 is a time chart showing one example of the control result of the DPF meltdown prevention control.

In FIG. 3, in the case where the PM deposit amount correlation value Qpm is greater than the predetermined amount Q1, and smaller than or equal to the predetermined amount Q2 during the idle driving, the temporal changes of the DPF temperature Tdpf, the PM deposit amount correlation value Qpm, and the engine speed Ne are represented in the time chart, when the DPF melt-down prevention control is performed (solid line), when the target idle rotating speed Ni is the normal value Ni0 (broken line) and when it is held at the predetermined value Ni1 (dashed line).

As shown in FIG. 3, the DPF melt-down prevention control is performed to increase the target idle rotating speed Ni to the predetermined value Ni1 during the idle driving in a short time, whereby the DPF temperature Tdpf is suppressed far below the heat resistance temperature Tmax (e.g., 1200° C.), and the DPF 24 is prevented securely and efficiently from melting down due to superheating. Also, when the PM deposit amount correlation value Qpm falls below the predetermined amount Q1, as shown in FIG. 3, the DPF melt-down prevention control is ended, whereby the target idle rotating speed Ni is restored to the normal value Ni0 to keep the DPF temperature Tdpf from decreasing inadvertently due to the exhaust gas stream.

If the determination result at step S12 is true (Yes), and it is determined that the PM deposit amount correlation value Qpm is greater than the predetermined amount Q2, the routine goes to step S24.

At step S24, a determination is made whether or not the PM deposit amount correlation value Qpm is greater than the predetermined amount Q3 (e.g., 15 g/L) (Qpm>Q3). If the determination result is false (No), and it is determined that the PM deposit amount correlation value Qpm is smaller than or equal to the predetermined amount Q3, namely, the PM deposit amount correlation value Qpm is greater than the predetermined amount Q2 and smaller than or equal to the predetermined amount Q3, the routine goes to step S26.

At step S26, a determination is made whether or not the DPF temperature Tdpf is higher than the predetermined temperature T2 (predetermined value, e.g., 600° C.) by obtaining the DPF temperature Tdpf from the exhaust gas temperature, like step S14.

Herein, the predetermined temperature T2 (e.g., 600° C.) that is a threshold for determination is set to be lower than the predetermined temperature T3 (e.g., 650° C.). This is because the heat of combustion is more likely to be produced, namely, the DPF 24 is more likely to be superheated, as the PM deposit amount correlation value Qpm is larger, whereby there is a high possibility that the DPF will easily melt down, unless the threshold for determination is low.

If the determination result at step S26 is true (Yes), and it is determined that the DPF temperature Tdpf is higher than the predetermined temperature T2, the routine goes to step S28.

At step S28, a determination is made whether or not the engine is during the idle driving. If the determination result is true (Yes), and it is determined that the engine 1 is during the idle driving, the routine goes to step S30, where the target idle rotating speed Ni is set to the predetermined value Ni2 (e.g., 1000 rpm) as the required minimum value, which is greater than the predetermined value Ni1 (correction means). In this case, the target idle rotating speed Ni maybe gradually increased.

That is, if the PM deposit amount correlation value Qpm is greater than the predetermined amount Q2, and smaller than or equal to the predetermined amount Q3, and the DPF temperature Tdpf is higher than the predetermined temperature T2, there is a higher possibility that the PM is naturally burned so that the DPF 24 is superheated to melt down. Accordingly, the target idle rotating speed Ni is set to the predetermined value Ni2 that is greater than the predetermined value Ni1 in this case, whereby the exhaust gas flow rate is increased to increase the heat taking away amount and suppress a temperature elevation of the DPF 24. Thereby, it is possible to prevent efficiently and securely the DPF 24 from melting down due to superheating.

If the determination result at step S28 is false (No), and it is determined that the engine 1 is no during the idle driving, the routine directly returns.

On the other hand, if the determination result at step S26 is false (No), and it is determined that the PM deposit amount correlation value Qpm is greater than the predetermined value Q2, and smaller than or equal to the predetermined amount Q3, but the DPF temperature Tdpf is lower than or equal to the predetermined temperature T2, there is no possibility that the PM is naturally burned, irrespective of whether or not the engine is during the idle driving, so that the DPF 24 is superheated to melt down. Accordingly, the routine directly returns without increasing the target idle rotating speed Ni in this case (correction inhibition). Thereby, the DPF 24 is efficiently prevented from melting down due to superheating, without aggravating the fuel consumption or supercooling the DPF 24.

If the determination result at step S24 is true (Yes), and it is determined that the PM deposit amount correlation value Qpm is greater than the predetermined amount Q3, the routine goes to step S36.

At step S36, a determination is made whether or not the DPF temperature Tdpf is higher than the predetermined temperature T1 (predetermined value, e.g., 550° C.) by obtaining the DPF temperature Tdpf from the exhaust gas temperature, like steps S14 and S26.

Herein, the predetermined temperature T1 (e.g., 550° C.) as a threshold for determination is set to be lower than the predetermined temperature T2 (e.g., 600° C.), because the DPF 24 is more likely superheated as the PM deposit amount correlation value Qpm is increased, as above described, with a high possibility that the DPF will easily melt down unless the DPF temperature Tdpf as the threshold for determination is set to be lower.

If the determination result at step S36 is false (No), and it is determined that the DPF temperature Tdpf is lower than or equal to the predetermined temperature T1, the routine directly returns. On the other hand, if the determination result at step S36 is true (Yes), and it is determined that the DPF temperature Tdpf is higher than the predetermined temperature T1, the routine goes to step S38.

At step 38, a determination is made whether or not the engine 1 is in the idle driving. If the determination result is true (Yes), and it is determined that the engine 1 is in the idle driving, the routine goes to step 40, where the target idle rotating speed Ni is set to the predetermined value Ni3 (e.g., 1200 rpm) as the required minimum value, which is greater than the predetermined value Ni2 (correction means). In this case, the target idle rotating speed Ni may be gradually increased.

That is, if the PM deposit amount correlation value Qpm is greater than the predetermined amount Q3, and the DPF temperature Tdpf is higher than the predetermined temperature T1, there is a higher possibility that the PM is naturally burned so that the DPF 24 is superheated to melt down. Accordingly, in this case, the target idle rotating speed Ni is set to the predetermined value Ni3 that is greater than the predetermined value Ni2, whereby the exhaust gas flow rate is increased to increase the heat taking away amount, and suppress a temperature elevation of the DPF 24. Thereby, it is possible to prevent efficiently and securely the DPF 24 from melting down due to superheating.

If the determination result at step S38 is false (No), and it is determined that the engine 1 is not during the idle driving, the routine directly returns.

On the other hand, if the determination result at step S36 is false (No), and it is determined that the PM deposit amount correlation value Qpm is greater than the predetermined amount Q3, and the DPF temperature Tdpf is lower than or equal to the predetermined temperature T1, there is no possibility that the PM is naturally burned, irrespective of whether or not the engine is during the idle driving, so that the DPF 24 is superheated to melt down. Accordingly, in this case, the routine directly returns without increasing the target idle rotating speed Ni (correction inhibition). Thereby, the DPF 24 is efficiently prevented from melting down due to superheating, without aggravating the fuel consumption or supercooling the DPF 24.

One embodiment has been thus described, but the present invention is not limited to the above embodiment.

For example, an instance is considered where the idle driving is conducted immediately after the vehicle runs up the ascending slope with the engine 1 in high load driving in the above embodiment, but this invention is not limited to this instance, and may be applicable to an instance where the DPF 24 is forcefully regenerated due to post injection to increase the DPF temperature Tdpf, and the idle driving is suddenly conducted.

In the above embodiment, the exhaust gas temperature from the exhaust gas temperature sensor 32 is detected as the temperature correlation value of the DPF temperature Tdpf, but the exhaust gas temperature information from the exhaust gas temperature sensor 34 may be employed, or the temperature sensor may be provided in the DPF 24 to directly detect the temperature of the DPF 24.

In the above embodiment, when the DPF temperature Tdpf is lower than or equal to the predetermined temperatures T1, T2 and T3, an increase in the target idle rotating speed Ni is inhibited, but may be suppressed.

Also, in the above embodiment, in the control routine of the DPF melt-down prevention control as shown in FIG. 2, a determination is made whether or not the engine 1 is in the idle driving, after the comparison between the PM deposit amount correlation value Qpm and the predetermined amount, and the comparison between the DPF temperature Tdpf and the predetermined temperature, but this invention is not limited to thereto. After a determination is firstly made whether or not the engine 1 is during the idle driving, the comparison between the PM deposit amount correlation value Qpm and the predetermined amount, and the comparison between the DPF temperature Tdpf and the predetermined temperature may be made.

What is claimed is:

1. An exhaust emission control device for an internal combustion engine, comprising:
    a particulate filter for capturing the particulate matter in an exhaust gas, the particulate filter disposed in an exhaust system for the internal combustion engine;
    a deposit amount detecting section for detecting a deposit amount correlation value of the particulate matter captured by the particulate filter;
    a temperature detecting section for detecting a temperature correlation value of the particulate filter;
    an idle detecting section for detecting whether or not the internal combustion engine is in an idle driving state;
    an idle rotating speed control section for controlling the rotating speed of the internal combustion engine to be a target idle rotating speed when the internal combustion engine is in the idle driving state; and
    a correction section for correcting the target idle rotating speed to the higher rotating speed to suppress overheating of the particulate filter in accordance with detection results of the deposit amount detecting section, the temperature detecting section, and the idle detecting section.

2. The exhaust emission control device for internal combustion engine according to claim 1, wherein the correction section corrects the target idle rotating speed to the higher rotating speed, when the deposit amount correlation value of the particulate matter detected by the deposit amount detecting section is larger.

3. The exhaust emission control device for internal combustion engine according to claim 1, wherein the correction section corrects the target idle rotating speed to the higher rotating speed when the temperature correlation value of the particulate filter detected by the temperature detecting section is above a predetermined value, or inhibits or suppresses the correction for the target idle rotating speed when the temperature correlation value is at or below the predetermined value.

4. The exhaust emission control device for internal combustion engine according to claim 3, wherein the predetermined value is set to a lower temperature, when the deposit amount correlation value of the particulate matter detected by the deposit amount detecting section is larger.

5. The exhaust emission control device for internal combustion engine according to claim 1, wherein the correction section corrects the target idle rotating speed to the higher rotating speed to suppress overheating of the particulate filter in accordance with the detection results of the deposit amount detecting section and the temperature detecting section, when the idle detecting section detects that the internal combustion engine is in the idle driving state.

6. The exhaust emission control device for internal combustion engine according to claim 1, wherein the correction section sets the target idle rotating speed to the higher rotating speed in accordance with the deposit amount correlation value of the particulate matter detected, when the deposit amount correlation value of the particulate matter detected by the deposit amount detecting section is greater than a predetermined value, and the temperature correlation value of the particulate matter detected by the temperature detecting section is greater than a predetermined value that is set in accordance with the deposit amount correlation value of the particulate matter detected.

7. An exhaust emission control device for an internal combustion engine, comprising:
    a particulate filter for capturing the particulate matter in an exhaust gas, the particulate filter disposed in an exhaust system for the internal combustion engine;
    a deposit amount detecting section for detecting a deposit amount correlation value of the particulate matter captured by the particulate filter;
    a temperature detecting section for detecting a temperature correlation value of the particulate filter;
    an idle detecting section for detecting whether or not the internal combustion engine is in an idle driving state;
    an idle rotating speed setting section for setting a target idle rotating speed when the internal combustion engine is in the idle driving state;
    an idle rotating speed control section for controlling the rotating speed of the internal combustion engine to be the target idle rotating speed when the internal combustion engine is in the idle driving state; and
    a correction section for correcting the target idle rotating speed set by the idle rotating speed setting section to the higher rotating speed in a specific driving state where it is apprehended that the particulate filter is overheated in accordance with detection results of the deposit amount detecting section and the temperature detecting section, when the idle detecting section detects that the internal combustion engine is in the idle driving state.

* * * * *